United States Patent [19]

Garneau

[11] Patent Number: 5,207,119

[45] Date of Patent: May 4, 1993

[54] PEDAL MECHANISM FOR A HUMAN PROPULSION VEHICLE

[76] Inventor: Francois Garneau, 354 Emile, #3, Laval, Quebec, Canada, H7N 4M2

[21] Appl. No.: 832,163

[22] Filed: Feb. 6, 1992

[51] Int. Cl.[5] ........................ G05G 1/14; F16H 1/28
[52] U.S. Cl. ............................... 74/594.3; 74/594.2; 475/331
[58] Field of Search ............. 74/594.1, 594.2, 594.3; 280/252, 259, 260, 261, 214; 475/331

[56] References Cited

U.S. PATENT DOCUMENTS

| | | | |
|---|---|---|---|
| 518,777 | 4/1894 | Carr | 475/331 X |
| 631,208 | 8/1899 | Frazuer | 475/331 X |
| 4,193,324 | 3/1980 | Marc | 475/331 X |
| 4,271,719 | 6/1981 | King | 74/594.2 |
| 4,425,824 | 1/1984 | Koch | 74/750 |
| 4,706,516 | 11/1987 | Xi | 74/594.1 |
| 4,807,491 | 2/1989 | Stuckenbrok | 74/594.1 |
| 4,882,945 | 11/1989 | Trevizo | 74/594.1 X |
| 4,960,013 | 6/1990 | Sander | 74/594.3 |

FOREIGN PATENT DOCUMENTS

| | | |
|---|---|---|
| 1091266 | 12/1980 | Canada . |
| 0093201 | 11/1983 | European Pat. Off. . |
| 100308 | 4/1898 | Fed. Rep. of Germany ...... 475/331 |
| 3905579 | 9/1989 | Fed. Rep. of Germany ...... 475/331 |
| 937354 | 8/1948 | France ........................ 74/594.3 |
| 8016176 | 7/1980 | France . |
| 2603863 | 3/1988 | France . |
| 415833 | 11/1946 | Italy ............................ 74/594.2 |
| 269689 | 10/1989 | Japan ........................... 74/594.2 |
| 2055077 | 2/1981 | United Kingdom . |

Primary Examiner—Leslie A. Braun
Assistant Examiner—Khoi Q. Ta
Attorney, Agent, or Firm—Edwin E. Greigg; Ronald E. Greigg

[57] ABSTRACT

A pedal mechanism for a human propulsion vehicle such as a bicycle wherein the length of each of the pedal arm is increased during the power stroke and decreased during the return stroke of the rotation cycle. It comprises a pair of sun gears rigidly attached to the frame of the vehicle, each meshed to an adjacent planetary gear of identical diameter. A lever, radially projecting from each of the planetary gears, generate the alternative movement of the corresponding pedal arm. The levers also change the angular orientation of the pedal arms by moving them toward the power stroke zone, forcing the pedals arm to stay as long as possible in power stroke, thus giving the pedal mechanism no dead point. This pedal mechanism is very suitable for bicycle, especially mountain bicycles and racing bicycles where high power and efficiency are crucial.

4 Claims, 4 Drawing Sheets

PEDAL MECHANISM FOR A HUMAN PROPULSION VEHICLE

FIELD OF THE INVENTION

The present invention relates to a pedal mechanism for a human propulsion vehicle such as a bicycle or the like, wherein the length of each of the pedal arm is increased in the power stroke and decreased in the return stroke. The torque produced is then increased, thus improving efficiency and power of the vehicle. The pedal mechanism in also designed so as to change the angular orientation of the pedal arms by moving them forwardly in order to increase the time where each pedal arm is in the power stroke, thus reducing the time where the pedal arms are in the return stroke, which is the least efficiency position.

This pedal mechanism is very suitable for bicycle, especially mountain bicycles and racing bicycles where a high power and efficiency are crucial.

DESCRIPTION OF PRIOR ART

Pedal mechanisms with pedal arm length variation have already been suggested (see UK laid-open patent application 2,055,077 published on Feb. 5, 1981; European laid-open patent 93,201 published on Nov. 9, 1983; and U.S. Pat. No. 4,960,013 issued on Oct. 2, 1990).

UK laid-open patent application 2,055,077 discloses a bicycle crank assembly having a pedal arm at the end of which a disc or ring is freely rotatably mounted. A pedal is mounted on the disc or ring away from the center of rotation of the disc or ring. In use, the pedals are positioned away from the crank axis during the power stroke and close to it during the return stroke. However, this device creates unusual movement of the pedals and are not very efficient since the diameter of the disc or ring cannot be too large.

European laid-open patent 93,201 discloses a bicycle drive mechanism fitted with telescopic pedal arms. A roller guided by a lever and a curved rail causes the pedal arms to change their length according to their position in the cycle.

U.S. Pat. No. 4,960,013 discloses a bicycle pedal arm construction wherein a lever follower extends from each pedal arm into an associated lever slot decentered with reference to the center of rotation of the pedal arms. The levers and the lever followers make the length of the pedal arms varies according to their position in the cycle.

One of the drawbacks of those inventions is that there is a "neutral" point when the pedals are between the power stroke and the return stroke, where the efficiency of the devices is almost zero, due to their position with reference to the position of the forces applied on the pedals.

SUMMARY OF THE INVENTION

The object of the present invention is to provide a pedal mechanism for a human propulsion vehicle, such as a bicycle, wherein the length of the pedal arms is longer in the power stroke than in the return stroke and wherein the time of the return stroke is reduced.

In accordance with the invention, this object is achieved with a pedal mechanism for a human propulsion vehicle having a frame, the pedal mechanism comprising:

a power transmitting axle having two ends;

a case fixed at each end of the axle;

a sun gear rigidly attached to the frame adjacent each of the axle, the sun gears extending within the adjacent cases;

a planetary gear having a diameter identical to the one of the sun gears, each of the planetary gears being rotatably attached to one of the cases and meshed to the adjacent sun gear, each planetary gear having a radially projecting lever connected thereto, the lever having a free end on which is mounted a fixation pin extending parallel to the planetary gears;

two parallel pedal arms slidably mounted on the cases respectively, each pedal arms having two ends, a hole made in one of the ends, in which the fixation pin of the adjacent lever is rotatably inserted, and means to attach a pedal at the other of the ends, each pedal arm having a rotation cycle comprising two halves;

a guiding means pivotally attached to each case to guide and support the corresponding pedal arm when it is moved in and out from the case.

In use, forces applied onto the pedals brings in rotation the rotatable cases which themselves rotate the axle and force the planetary gears to rotate around the sun gears. The levers on the planetary gears are arranged so that each pedal arm slides away from the axle at a position in one of the halves of the cycle where the applied forces are to be maximum in order to have a maximum torque on the axle. The pedal arms also have an angular displacement whereby the half of the cycle where the forces are maximum, is longer than the other half.

According to a preferred embodiment, the pedal mechanism further comprises a sprocket acting as a transmitting means. The sprocket is attached to one of the cases to rotate therewith together with the axle.

According to another preferred embodiment, the guiding means include of a set of at least three rollers sliding in a longitudinal slot made in an enclosure located inside the pedal arms.

A non restrictive description of a preferred embodiment of the invention will now be given with reference to the appended drawings.

BRIEF DESCRIPTION OF THE DRAWINGS

FIG. 4 is a schematic representation of the path of a

DESCRIPTION OF A PREFERRED EMBODIMENT

Figure 1:
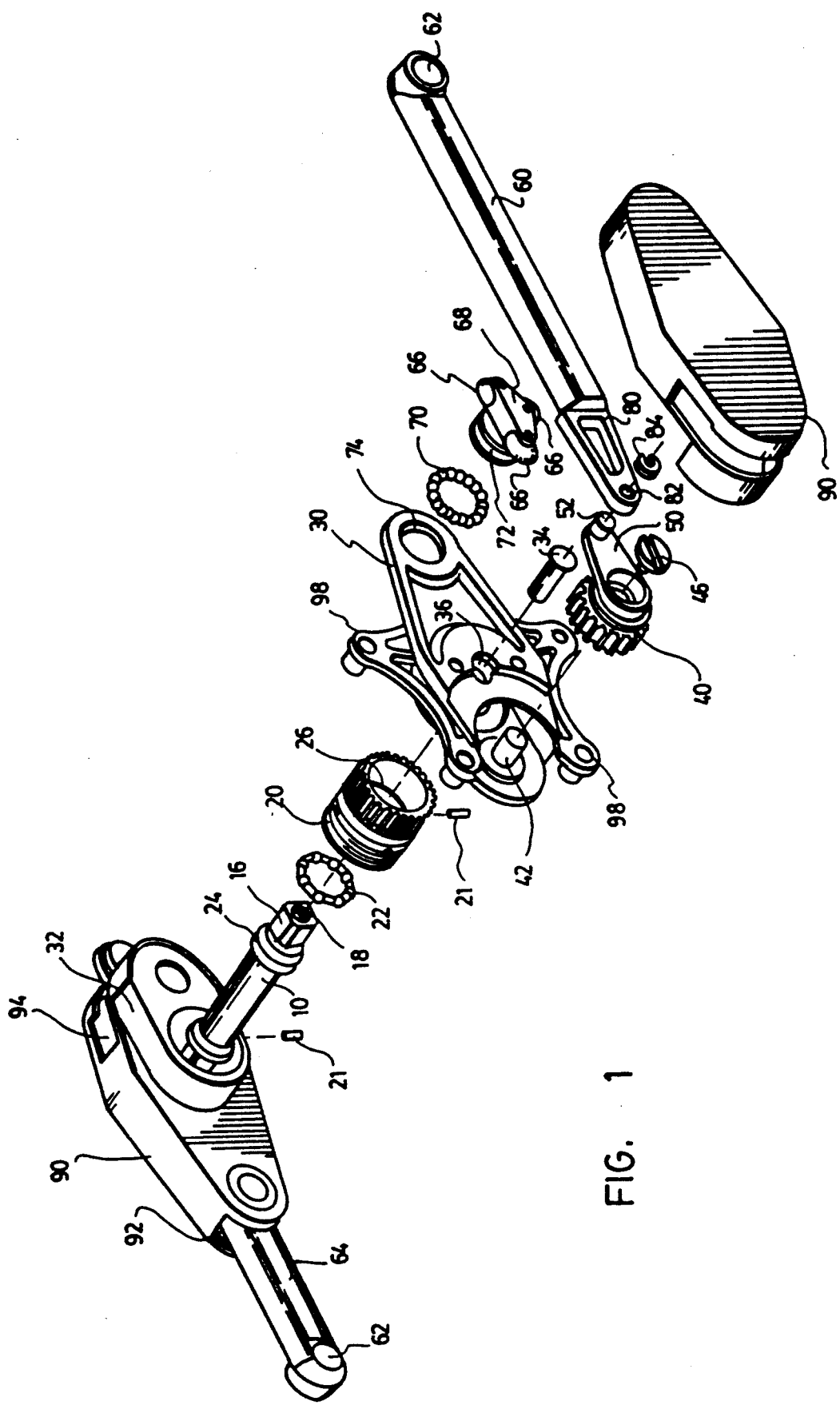
FIG. 1 is a half exploded perspective view of the pedal mechanism according to the invention.
Figure 2:
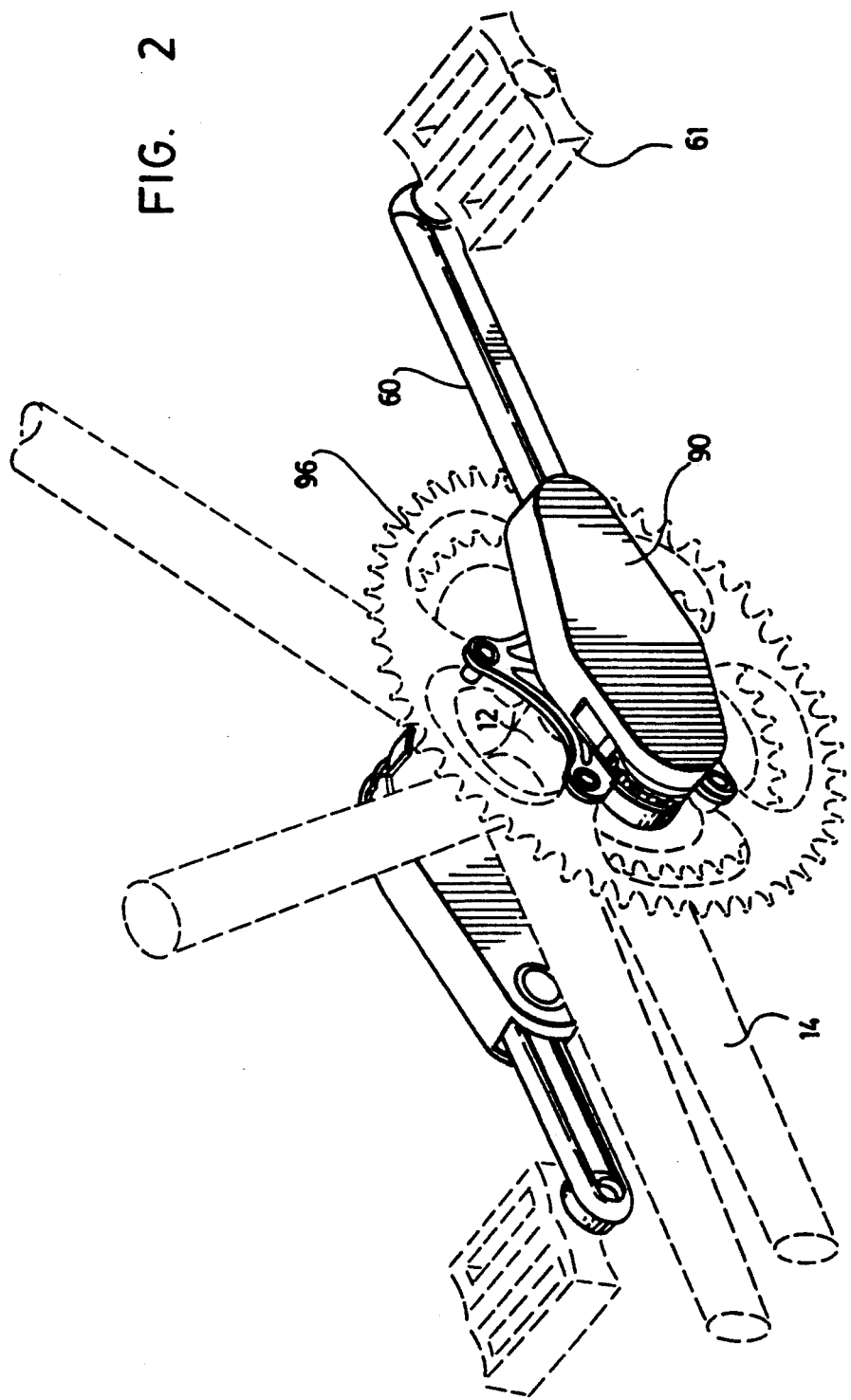
FIG. 2 is a perspective view of the pedal assembly incorporating the mechanism of FIG. 1, installed on a bicycle frame.

The pedal mechanism according to the invention as shown in FIGS. 1 and 2 has two side portions, respectively right and left, comprising the same mechanisms disposed 180° apart. The two side portions are joined by an axle 10 located inside the bottom tube 12 of the frame 14 of the vehicle such as a bicycle. The axle 10 has a pair of slightly conical ends 16 of rectangular cross-section, with a centrally positioned threaded hole 18. Each end of the axle 10 is rotatably mounted in the central cavity of a hollow sun gear 20 which is rigidly attached to the frame 14, more particularly, to the bottom tube 12. The sun gear 20, which has a threaded outer portion, is screwed inside the bottom tube 12 and then locked to it by means of key-bolts 21.

The axle 10 is rotatably connected to each sun gear 20 by means of a bearing 22 mounted between a first bearing track 24 located on the axle 10 and a second bearing track 26 located inside the sun gear 20. A small portion of the ends of the axle 10 jut out the sun gears 20.

The axle 10 and each sun gear 20 are located into a case 30. Each case 30 has an enclosure 32 in which the adjacent sun gear 20 is located. A bolt 34 passing through a hole 36 is provided in the case 30 and is screwed to the threaded hole 18 of the axle 10 rigidly attaching the axle 10 to the case 30. Each slightly conical ends 16 leans against the bottom of a conical hole (not shown) which align it with the hole 36.

Alternatively, the threaded hole 18 can be substituted for a threaded peg (not shown) which extends through the hole 36 and is fixed to the case 30 by a nut.

Each sun gear 20 has an adjacent planetary gear 40. The sun gears 20 and the planetary gears 40 have an identical diameter and an identical set of tooth. Each planetary gear 40 is located in enclosure 32 and meshed to the adjacent sun gear 20. The planetary gears 40 are rotatably attached to their corresponding case 30 by means of a lubricated axle 42. A screw 46 prevents the planetary gear 40 from moving axially.

Each planetary gear 40 have a radially projecting lever 50 connected thereto. The lever 50 has a free end on which is mounted a fixation pin 52 extending parallel to the planetary gear 40.

Two sliding pedal arms 60, each located on each sides of the pedal mechanism, ensure the transmission of forces applied by the feet of the user on the pedal 62 located at one of their ends. The pedals 61 are rotatably attached to the pedal arms 60 inside the holes 62.

The pedal arms 60 have an enclosure in which a longitudinal slot 64 made therein, as a racetrack for the roller 66. The roller guide 66 comprise a set of three rollers mounted on an support 68. The roller support 68 is rotatably attached to the case 30 by means of a bearing 70 mounted between the racetrack 72 of the roller support 68 and the hole 74.

Each pedal arm 60 has an end portion 80 with a hole 82 in which the fixation pin 52 is rotatably inserted. A key 84 prevents the pin 52 to get out of the hole 82.

Each planetary gear 40 and its corresponding lever 50 are arranged so that the lever 50 extends towards the pedal 61 when the length of the pedal arm 60 must be maximum, more specifically in the power stroke where the force applied on the pedal 61 is maximum. Usually, this occurs on a bicycle near the 90° position as it can be seen on FIG. 3.

To complete the assembly, a cover 90 is rigidly fixed over each case 30. The cover 90 has a front and a rear openings, respectively numbered 92 and 94, so the pedal arms 60 could slide therein and the lever 50 extend rearwardly thereto.

In use, a force applied onto a pedal 61 is transmitted to the corresponding roller guide 64 and to the fixation pin 52. The force creates a torque on the corresponding case 30 where the only degree of freedom it has is the rotation along with the axle 10. Since the two sides of the pedal mechanism are link together by the axle 10, their movement is always synchronized. Both cases 30 then start to turn with all the components, except the sun gears 20. The planetary gears 40, since they are meshed to the non-moving sun gears 20, start to turn in counter rotation, turning with them their corresponding lever 50 and fixation pin 52. The movement of the case 30 will then slides the pedal arms 60 back and forth as the planetary gears 40 turn around their adjacent sun gear 20.

Figure 3:
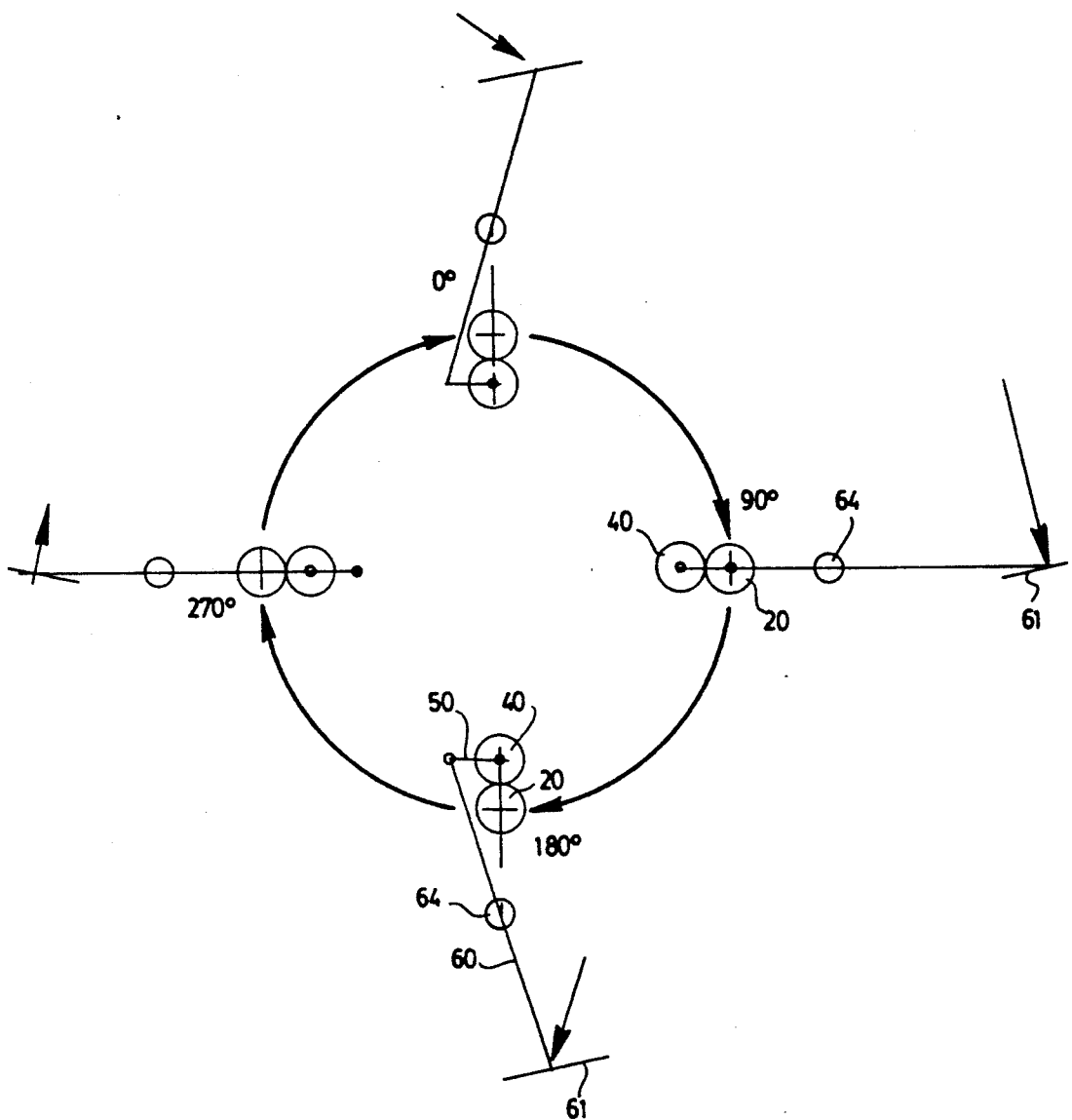
FIG. 3 is a schematic representation of the forces applied to the pedals according to their position.
Figure 4:
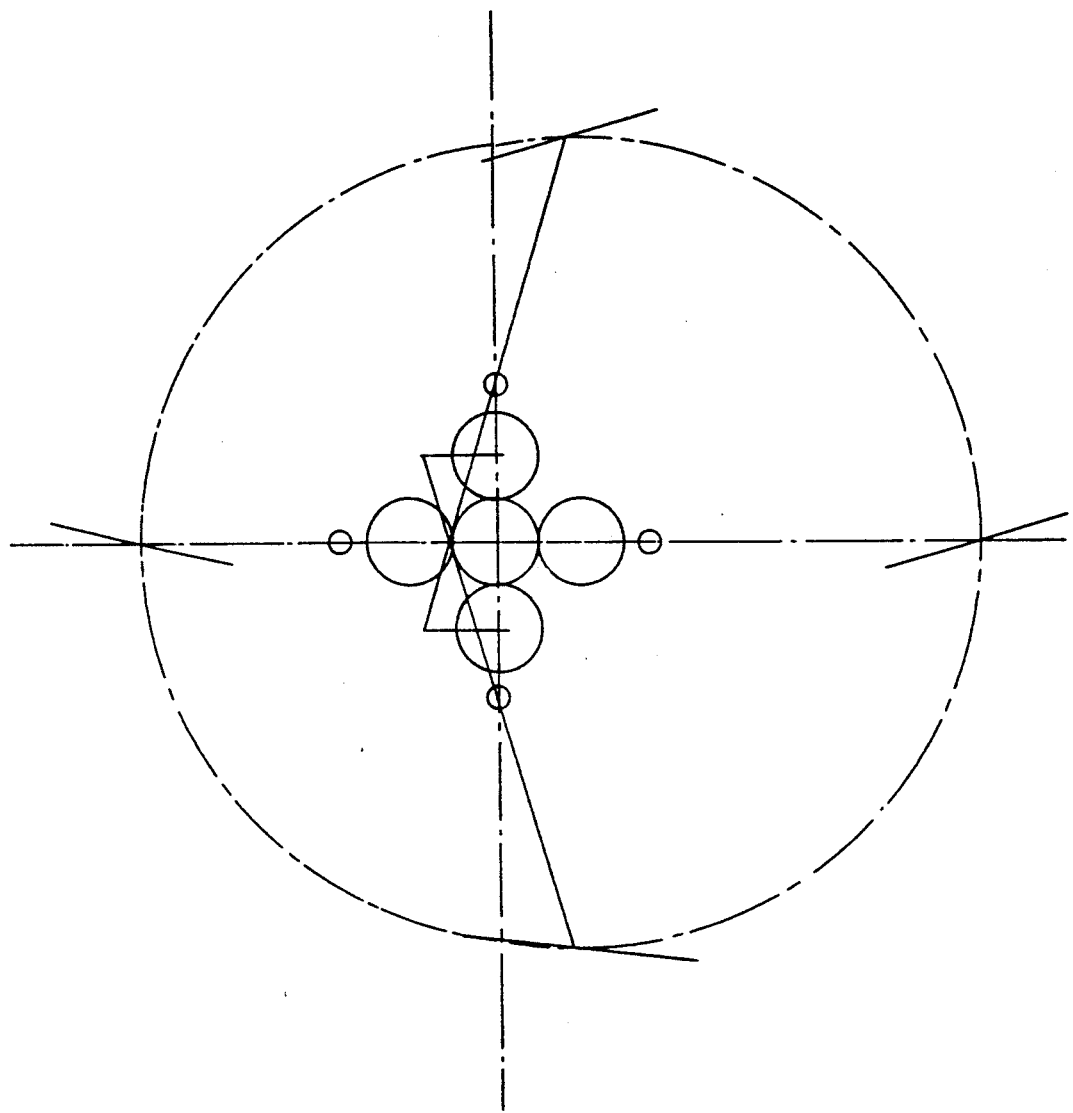

Since the cases 30 are set as to have a maximum length of the pedal arms 60 in the middle of the power stroke, their length will then be minimum in the middle of the return stroke, which is generally when the pedals 61 go up. FIG. 4 shows the path of the pedals. As it can be seen, the path is oval and slightly forwardly decentered. Since a greater lever arm produce a higher torque for the same applied force, the torque generated will then be higher than the one generate by a conventional pedal assembly. In FIG. 3, the lever arm is the pedal arm 60 and it maximum extension is reached at 90°.

As it can also be seen in FIG. 3, the force applied at 0° is slightly in angle, thus not perfectly perpendicular to the pedal arm 60. This is due to the position of the user which is, on a bicycle, slightly behind the center of rotation of the axle 10.

The movement of the lever 50, in addition to the back and forth movement, change the angular orientation of the pedal arm 60 in a way that the pedals 61 are in a forward position when the cases 30 are respectively at the top and the bottom of the path, more precisely, when they have almost an angle of 0° and 180°, which are, usually the positions where the least torque is produced (see FIG. 3). On conventional pedal mechanisms, the angular orientation of the pedal arms is not changed.

In the present invention, the forward angular orientation of the pedal arms 60 give a more convenient orientation for the forces applied on the pedal arms 60 at that moment, thus producing a higher torque since the pedal arms 60 are more perpendicular to the forces that they would be without their angular orientation change. It also forces the pedals arms to stay longer in power stroke than in return stroke.

When the pedal mechanism is in movement, it drives a sprocket 96 connected to one of the cases 30 which is modified to accommodate a fixation means consisting of bolts rigidly fixing the sprocket to the extended sides 98 of the lever 50. Alternatively, the sprocket 96 can be rigidly attached to the axle 10. The pedal mechanism can also be attached directly to a wheel (not shown).

Since the construction of the pedal mechanism is very simple and almost all its components are located in the cases 30, the pedal mechanism can be mounted on any bicycle frame that are commonly sold on the market with only minor modifications.

The embodiments of the invention in which an exclusive property or privilege is claimed are defined as follows:

1. A pedal mechanism for a human propulsion vehicle having a frame, said pedal mechanism comprising:
   a power transmitting axle having two ends;
   a case fixed at each end of said axle;
   a sun gear rigidly attached to the frame adjacent each of said axle, said sun gears extending within the adjacent cases;
   a planetary gear having a diameter identical to the one of the sun gears, each of said planetary gears being rotatably attached to one of the cases and meshed to the adjacent sun gear, each planetary gear having a radially projecting lever connected thereto, said lever having a free end on which is mounted a fixation pin extending parallel to said planetary gears;

two parallel pedal arms slidably mounted on said cases respectively, each pedal arms having two ends, a hole made in one of said ends, in which the fixation pin of the adjacent lever is rotatably inserted, and means to attach a pedal at the other of said ends, each pedal arm having a rotation cycle comprising two halves;

a guiding means pivotally attached to each case to guide and support the corresponding pedal arm when it is moved in and out from the case;

whereby, in use, forces applied onto said pedals brings in rotation said rotatable cases which themselves rotate said axle and force said planetary gears to rotate around said sun gears, said levers on said planetary gears being arranged so that each pedal arm slides away from said axle at a position in one of the halves of the cycle where said applied forces are to be maximum in order to have a maximum torque on said axle, said pedal arms also having an angular displacement with respect to a radial centerline intersecting the sun gear and the guiding means wherein said one half of the cycle having said forces at maximum, is longer than the other half.

2. The pedal mechanism of claim 1, further comprising a sprocket acting as a transmitting means, said sprocket being attached to one of the cases to rotate therewith together with said axle.

3. The pedal mechanism of claim 1, wherein said guiding means include of a set of at least three rollers sliding in a longitudinal slot made in an enclosure located inside said pedal arms.

4. The pedal mechanism of claim 1, wherein said human propulsion vehicle is a bicycle.

* * * * *